United States Patent
Hohmeier

(10) Patent No.: US 12,462,196 B2
(45) Date of Patent: Nov. 4, 2025

(54) DEVICES AND METHODS FOR FEDERATED COMPUTING

(71) Applicant: Katulu GmbH, Hamburg (DE)

(72) Inventor: Orlando Hohmeier, Hamburg (DE)

(73) Assignee: Katulu GmbH, Hamburg (DE)

( * ) Notice: Subject to any disclaimer, the term of this patent is extended or adjusted under 35 U.S.C. 154(b) by 0 days.

(21) Appl. No.: 18/661,309

(22) Filed: May 10, 2024

(65) Prior Publication Data

US 2024/0378505 A1  Nov. 14, 2024

(30) Foreign Application Priority Data

May 12, 2023 (EP) ...................... 23173184

(51) Int. Cl.
*G06F 17/00* (2019.01)
*G06F 16/25* (2019.01)
*G06N 20/00* (2019.01)

(52) U.S. Cl.
CPC ........... *G06N 20/00* (2019.01); *G06F 16/254* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 2022/0391781 A1* | 12/2022 | Litany | ..................... | G06N 3/098 |
| 2023/0074653 A1* | 3/2023 | Mawson | ............ | G06Q 20/0855 |
| 2023/0127572 A1* | 4/2023 | Jacob | .................. | G06F 21/6227 707/755 |
| 2023/0229786 A1* | 7/2023 | Eloul | ..................... | G06N 3/098 726/25 |
| 2023/0245171 A1* | 8/2023 | Niu | ..................... | G06Q 30/0256 705/14.55 |
| 2023/0315731 A1* | 10/2023 | Xu | ..................... | G06F 16/24537 707/714 |
| 2023/0325389 A1* | 10/2023 | Fan | .................. | G06F 16/24537 |
| 2023/0359619 A1* | 11/2023 | Sharan | .................. | G06F 16/283 |

(Continued)

OTHER PUBLICATIONS

Hiessl, Thomas, et al., Cohort-based federated learning services for industrial collaboration on the edge, Journal of Parallel and Distributed Computing, May 2, 2022, 14 pages.

*Primary Examiner* — Hung D Le
(74) *Attorney, Agent, or Firm* — Stoel Rives LLP

(57) ABSTRACT

A client for a federated computing system is configured to store one or more input data records, extract input data schemas therefrom and transfer them to a server. Using the process pipeline received from the server, an output data record is generated from one or more of the input data records whose input data schema matches a process data schema of the process pipeline and transferred to the server. A server for a federated computing system is configured to receive and register input data schemas from one or more clients, obtain a process pipeline based on a process data schema from a user, and transfer it to one or more of the clients whose registered input data schemas match the process data schema. Output data records are then received from one or more clients, aggregated and provided to the user. Computer-implemented methods and computer program products are also provided.

18 Claims, 3 Drawing Sheets

(56) References Cited

U.S. PATENT DOCUMENTS

2023/0401452 A1\* 12/2023 Bazzi .................. G06N 5/01
2024/0062102 A1\* 2/2024 Lal .................... H04L 9/008
2024/0143745 A1\* 5/2024 Vajipayajula ......... G06F 21/554

\* cited by examiner

DEVICES AND METHODS FOR FEDERATED COMPUTING

CROSS REFERENCE TO RELATED APPLICATIONS

This application claims priority under 35 U.S.C. § 119 (a)-(d) of European Patent Application No. 23173184.5, filed May 12, 2023, which is hereby incorporated by reference in its entirety.

BACKGROUND

Common systems and methods for machine learning and analysis use direct access to input data to process the data and perform machine learning or analysis, hereinafter referred to collectively as computing. A computer system is provided with input data and calculation instructions and calculates the output data from the input data. The output data may be trained models or analysis results.

Distributed computing has been a well-known method for several decades. By distributing the computing load across several computing units (nodes), and thus using genuine concurrent processes, it was possible to achieve advantages over centralized computing on one computing unit. This involves increasing performance by breaking down a task into parts, each of which is calculated simultaneously on one of the nodes. Another advantage is scalability, as additional nodes can be added. Further advantages are failure safety and redundancy.

In distributed computing, input data and calculation instructions, i.e. a pipeline, are sent to remote clients and the output data is sent back. This generates large amounts of data during transmission. Other disadvantages of distributed computing are, for example, the need for additional administration of the nodes, possibly on a central server, as well as greater risks, as data has to be transferred between the nodes and possibly the server. In addition, in conventional distributed computing, where only the computing power of the remote systems is relevant, it may also be necessary to send large amounts of data in order to transfer the input data and the calculation rules as well as the calculation results, i.e. the output data. Large amounts of data require large bandwidth.

Distributed computing may also be used in machine learning, wherein an untrained model, training data and a pipeline containing the instructions for training are usually transferred from a server to several clients and a trained model is transferred back to the server. A pipeline is usually a series of consecutive steps or operations used to process and analyze data. In machine learning as an example, a pipeline usually contains the architecture of the model to be trained and the training instructions for the system that is to train a model.

Federated learning may be seen as a further development of distributed computing, in which the focus is no longer on simply using the computing power of distributed systems, but rather on the distributed training of machine learning models.

Another further development of distributed computing is federated data analysis. Similar to federated learning, the data to be analyzed is already available in the nodes and may differ greatly from the other nodes both in terms of quantity and type of data. The process steps are transferred from the server for analysis. An analysis is not usually referred to as a pipeline, but the sequence of functions, i.e. the process steps used for the analysis, may also be understood as a pipeline. This type of distributed computing is referred to below as federated analysis. Federated learning and federated analysis may be summarized as federated computing. In the context of this description, a pipeline is a sequence of operations, also called processes, which is used for federated computing, i.e. machine learning or analysis.

In contrast to distributed computing, input or training data that are already available on the client are generally used here. One of the reasons for this may be that a company does not want to or is not allowed to disclose the data that is to be used as training data.

In federated learning, a machine learning model is trained on several nodes, each with local data records, without exchanging the data. Only the pipeline is transferred from the server to the clients. The pipeline may include the architecture of the model to be trained, i.e. the untrained model. Training may be achieved by training a model on each of the nodes. Optionally, the nodes may exchange information and communicate updated model parameters to each other at regular intervals. The individual trained models may then be combined, for example by a server, which is also known as aggregation, whereby the sub-models are combined into a complete model.

Federated computing may help overcome data barriers to data sharing by enabling organizations to train machine learning models on distributed data sources without sharing confidential information or violating privacy regulations or perform analysis on the distributed data sources with the same advantages.

When using so-called fitness apps to record cycling and running routes, shared aggregated forms of data are used, such as global maps with particularly frequently completed routes. However, this data may contain sensitive information that can also be traced back to the origin of the data, i.e. the users. During tests, for example, military bases were identified and it was even possible to trace the routes of individual people from their sites of operation to their homes.

In addition, data that are often collected unnoticed by users and usually anonymized, such as by weather apps, may also be used to find out personal information about users. In one experiment, such data were used to obtain information about people who worked in nuclear power plants or attended certain churches.

Neither the simple aggregated forms nor the anonymization of data is a sufficient measure to protect the data, as research has shown that most data points can be de-anonymized with the right techniques.

The desire for privacy and data protection is increasing, but the industry's current methods for protecting data are often inadequate. As a result, data owners are less willing to share their data.

In addition, there are also types of data that are generally not shared, for example because of their value as trade secrets or intellectual property or due to data protection regulations such as GDPR, HIPAA and industry-specific regulations.

Another obstacle is the cost and associated energy consumption associated with streaming and storing huge amounts of data across different clouds and on-premise installations. These costs and the lack of data security prevent this use of data despite the known advantages of using machine learning on a comprehensive data record, for example to make better business decisions.

These different data barriers lead to fragmented and/or unavailable data.

This poses significant challenges for larger companies with different business units, as it prevents the sharing of data across the entire company.

Organizational barriers, including incompatible data systems and political tensions, may also limit data sharing within large organizations.

This lack of access to data limits the ability to train machine learning models to make intelligent business decisions.

Without input data, however, neither machine learning nor analysis methods can be used, which are, for example, the prerequisite for optimizing various industrial processes, developing autonomous systems or automatic assistance systems.

In addition to the factors mentioned, such as the unwillingness to share data, export control, data transfer costs and data protection regulations, the fact that data come from different data sources results in further data barriers that require a certain amount of effort, for example to standardize different data sources in a coherent system, i.e. to homogenize the input data.

While in distributed learning properly speaking the training data is largely homogeneous and distributed fairly evenly in terms of quantity, in federated learning the training data may be quite heterogeneous and the nodes may have training data records of different sizes. The same applies to federated analysis.

In order to homogenize the data, pre-processing of the data is necessary. This may include that the data may have to be made machine-readable. This process and transferring the necessary parts for training or analysis is difficult and error-prone.

Different data sources exist in different forms and formats, making it difficult to match and process them for machine learning or analysis purposes.

In addition, the pre-processing of data for machine learning, for example for feature extraction (feature engineering), has a significant influence on the quality of the machine learning model used. However, this process is error-prone as it is heavily dependent on the input data. It also prevents feature engineering, which is a major problem for deployments in variable and dynamic environments such as factories, hospitals and large organizations with shared data ownership.

Current state-of-the-art methods do not provide a mechanism for processing different data sources and overcoming all data barriers.

The described differences in the data sources for both types of federated computing result in significant disadvantages, as the training data in particular cannot be properly pre-processed in advance, as they are only available for the node. In federated learning, this makes feature extraction more difficult or prevents it. Likewise, with federated analysis, the data to be analyzed cannot be prepared in order to carry out the analysis with the greatest possible effectiveness and efficiency.

In summary, it follows that data preparation, feature extraction and the homogenization of different data records are not solved in the current state of the art for federated computing. This makes federated computing unsuitable in heterogeneous environments such as industrial plants or autonomous vehicles. Furthermore, it is not possible with the state of the art to use a data record multiple times for different machine learning and/or analysis tasks, because the prior art lacks the necessary mechanisms for processing and extracting different features while maintaining the principles relevant for avoiding the data barriers, in particular the privacy of the data.

SUMMARY

A first embodiment comprises a device as a client for a federated computing system, which is configured to store one or more input data records, to extract an input data schema from each input data record, to transfer the extracted input data schemas to a server, to receive a process pipeline based on a process data schema from the server, to generate an output data record from one or more of the input data records whose input data schema matches the process data schema using the process pipeline, and transfer the generated output data records to the server.

In a second embodiment, a device is provided as a server for a federated computing system configured to receive input data schemas from one or more clients, to register the received input data schemas, to receive a process pipeline based on a process data schema from a user, to transfer the process pipeline to one or more of the clients whose registered input data schemas match the process data schema, to receive output data records from one or more clients, to aggregate the output data records received, and to provide the aggregated output data records to the user.

By executing the process pipeline only on clients that have saved input data records whose schema matches the process data schema on which the process pipeline is based, it is possible to prevent the processing of the process pipeline from failing. Furthermore, the registration of input data schemas allows the existing input data records to be used for several applications. By using the process data schema, a more suitable process pipeline may be generated and deployed, improving federated computing overall. This applies to each of the clients as well as the server.

In an advantageous advancement of the clients, the client device comprises a storage unit and a computing unit. The storage unit is configured to store the input data records. The computing unit is configured to receive the input data records from the storage unit, to extract the input data schemas from the input data records, to register the input data schemas in the server, to receive the process pipeline from the server, to generate the output data records from the input data records using the process pipeline, and to transfer the output data records to the server. The storage unit and the computing unit are configured in one data processing device or in several different data processing devices which are, however, connected to one another by a privileged transfer path.

This allows the data storage to be advantageously separated from the local computing unit in the nodes. This allows the client to process multiple data sources, for example, or to use different computing units for different data sources.

In an advantageous advancement of the server, the device is configured to output the registered input data schemas as process data schemas in response to a request from the user.

The process data schema used for the process pipeline may thus be adapted to the registered input data schemas, i.e. the resulting process pipeline is operable for the corresponding input data records.

In an advantageous advancement of the server, the device is also configured to check the executability of the process pipeline for the registered input data schemas.

The process pipeline received may thus be checked for executability by the server before it is distributed to the clients, thus avoiding errors during processing by the clients. A check may also be carried out before transferring to the server or at any other time as an alternative and/or in addition.

In an advantageous advancement of the clients and/or the server, the process pipeline is configured in such a way that, by generating an output data record from an input data record, either machine learning is performed such that the input data record is used as training data and the output data record represents a trained model or a part thereof, or analysis is performed such that the input data record is analyzed and the output data record represents analysis results or a part thereof.

The use of a corresponding process pipeline improves federated learning or federated analysis. In particular, this makes it possible to use the existing input data records multiple times, possibly for applications of different types, i.e. federated learning and federated analysis, without having to carry out pre-processing again. For example, an input data record in a vehicle may thus be used to first train a model to recognize traffic signs, and then an analysis of the recorded traffic may be carried out.

In an advantageous advancement of the clients and/or the server, the process pipeline is packaged in a format, wherein the format is a binary format describing the process pipeline in a directed, acyclic graph, or the format is a byte code that is suited for execution in a virtual machine.

By using a binary format or a byte code for the process pipeline, storage requirement, transmission speed and security may be increased.

In an advantageous advancement of the clients and/or the server, the process pipeline and/or at least one of the output data records is encrypted, or encrypted and signed, and decryptable, or decryptable and verifiable, by the clients.

Data security may be increased by encrypting the process pipeline and/or the output data records. By signing and verifying, for example, it is possible to ensure that only authorized users can use them.

In a third embodiment, a federated computing system is provided comprising one or more clients described above and a server described above.

In a fourth embodiment, a computer-implemented client method for federated computing is provided for a client having one or more input data records, the method comprising the steps of: extracting an input data schema from each input data record, transferring the extracted input data schemas to a server, receiving a process pipeline based on a process data schema from the server, generating a corresponding output data record from one or more of the input data records whose input data schema matches the process data schema using the process pipeline, and transferring the generated output data records to the server.

In a fifth embodiment, a computer-implemented server method for federated computing for a server is provided, the method comprising the steps of: receiving input data schemas from one or more clients, registering the received input data schemas, receiving a process pipeline based on a process data schema from a user, transferring the process pipeline to one or more clients whose registered input data schemas match the process data schema, receiving output data records from one or more clients, aggregating the received output data records, and providing the aggregated output records to the user.

By using the input data schemas, a more suitable process pipeline may be generated and deployed, improving federated computing overall. This applies to both the client method and the server method.

The advantageous advancements of the first and second embodiments may also be applied to the fourth and fifth embodiments.

In a sixth embodiment, a computer-implemented method for federated computing is provided, comprising a computer-implemented client method described above and a computer-implemented server method described above.

In a seventh embodiment, a computer program product with a program for a data processing system is provided, wherein the computer program product comprises software code portions for performing the steps of a method described above when the program is executed on the data processing system.

In an advantageous advancement of the computer program product, this comprises a computer-readable medium on which the software code portions are stored, wherein the program is directly loadable into an internal memory of the data processing device.

The embodiments and advancements show possible embodiment variants, wherein the invention is not limited to the specifically shown embodiment variants thereof, but rather combinations of the individual embodiment variants with one another are also possible.

BRIEF DESCRIPTION OF THE DRAWINGS

For the purpose of better understanding of the invention, this will be elucidated in more detail by means of the figures below. These show respectively in a very simplified schematic representation.

DETAILED DESCRIPTION OF PREFERRED EMBODIMENTS

First of all, it is to be noted that in the different embodiments described, equal parts are provided with equal reference numbers, where the disclosures contained in the entire description may be analogously transferred to equal parts with equal reference numbers. Also, the positional indications chosen in the description, e.g. top, bottom, side, etc., refer to the figure directly described and depicted and, in the case of a change of position, these positional indications are to be transferred mutatis mutandis to the new position.

Figure 1:
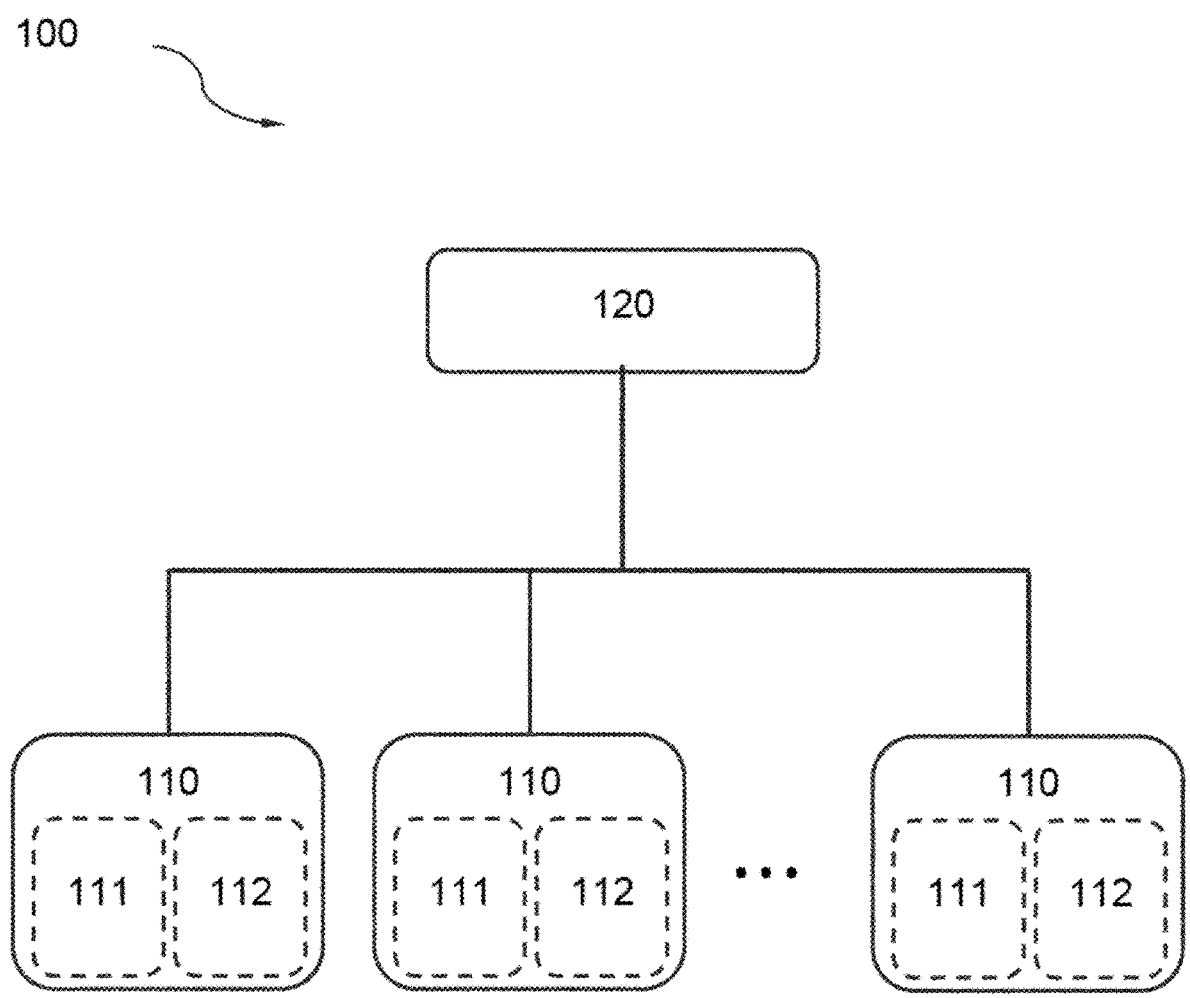
FIG. 1 shows an exemplary structure of a system according to an embodiment comprising several clients and a server.
Figure 2:
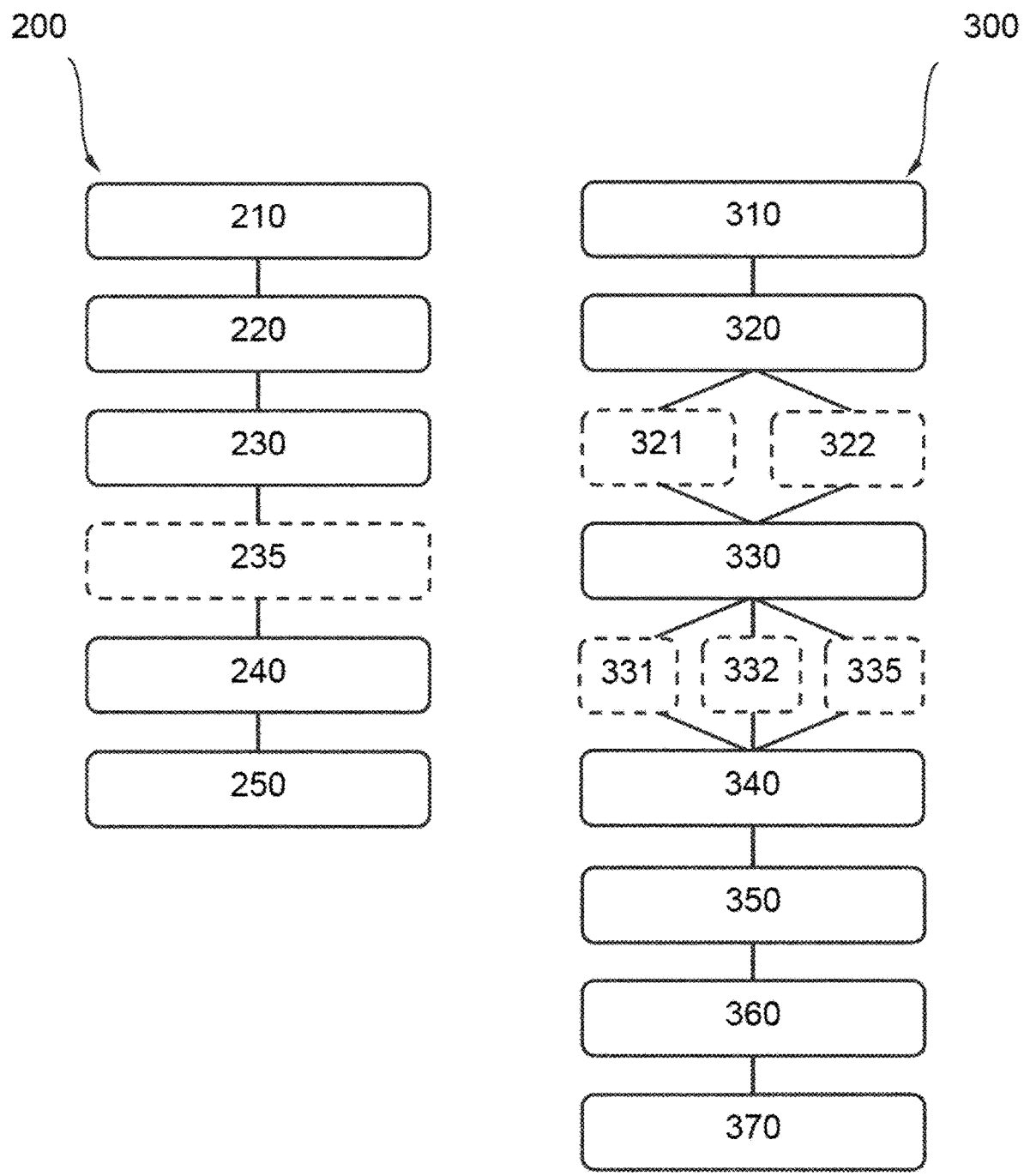
FIG. 2 shows exemplary flow diagrams of the inventive processes.
Figure 3:
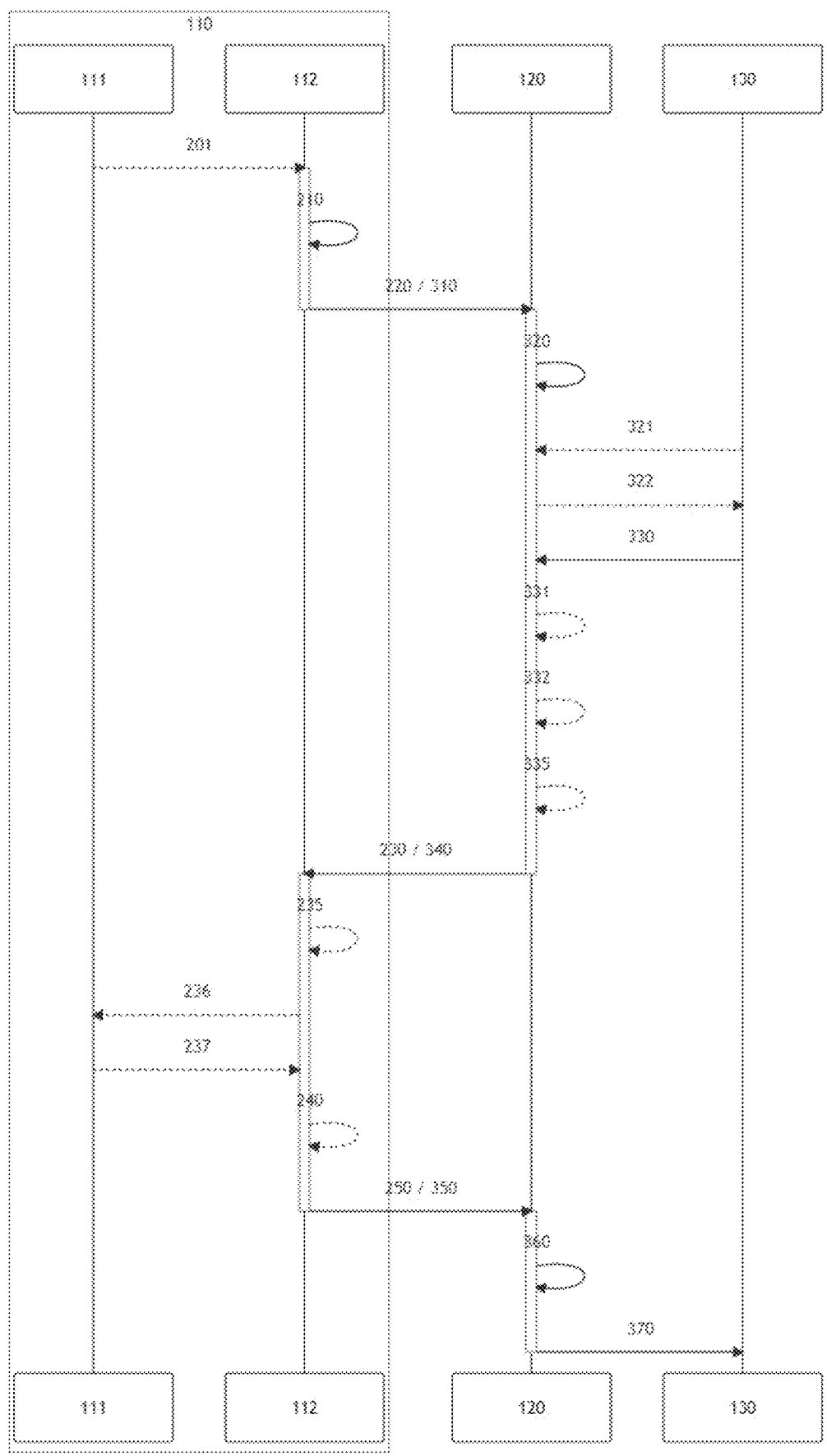
FIG. 3 shows an exemplary sequence diagram.

In the following, the devices and methods are explained with reference to FIG. 1 together with FIGS. 2 and 3. Optional configurations and advancements are generally shown as dashed lines.

The devices, clients 110 and servers 120 may be located at different sites and connected to each other via a data link. This data link may be the Internet or a dedicated wired or wireless data link. It is also conceivable that the data is transferred between the clients 110 and the server 120 via a data medium, such as a USB stick or as an e-mail attachment.

Each of the clients 110 may be located, for example, at a company that wants to participate in a federated computing project. In this example, the server 120 may be located elsewhere, e.g. at a service provider or a research institution. FIG. 1 shows three clients 110 as an example, but any number of clients 110 is conceivable. A client 110 is a unit that may refer to a device, for example a computer, which has the sole task of participating in federated computing. The client may then consist of a storage unit 111, in which the data for federated computing is stored, and a computing unit 112, which performs the communication and computing tasks. In an optional step 201, the data may be loaded from the storage unit 111 into the computing unit 112. Alternatively, a client 110 may also be configured as a program that a person in a company, in the above example, installs on an existing computer on which, for example, the input data is stored. For example, such a program may also run in the background as a so-called service or daemon, without interaction with users. The input data may also be loaded into the client 110 in step 201, so that the client is prepared for the tasks of federated computing. Computing unit 112 may refer, for example, to a CPU (Central Processing Unit) or GPU (Graphics Processing Unit), but alternatively also to a virtual machine or a runtime environment.

Specifically, the storage unit 111 stores the input data records. The computing unit 112 receives the input data records from the storage unit 111, extracts the input data schemas from the input data records, transfers the input data schemas to the server 120, receives the process pipeline from the server 120, generates the output data records from the input data records using the process pipeline, and transfers the output data records to the server 120.

If a client 110 is divided into a storage unit 111 and a computing unit, the storage unit 111 and the computing unit 112 may be located in a data processing device, e.g. a computer. Alternatively, an arrangement is conceivable in which the storage unit 111, of which there may be several, and the computing unit 112 are located in several different data processing devices which are, however, connected to one another by a privileged transfer path. A privileged transfer path could, for example, be a specially protected company network or a group of devices not connected to the Internet.

Each of the clients 110 may therefore save one or more input data records. These input data records may, for example, be machine data from a production machine, such as a milling machine, or production data from the production of batteries or semiconductors. This production data may be coordinates, travel routes, maintenance times and operating times of tools or relate to measurements, tolerances, recorded errors or similar in production. Other data such as work steps, tool types, etc. may also be found in the input data.

Data that belong together, for example of a machine, a process or similar, is referred to as an input data record.

In step 210, a client 110 extracts a data schema from each input data record. A data schema provides a context via both a description and property names of the input data. Table 1 shows a generic, exemplary data schema.

TABLE 1

```
{
  "type": "object",
  "properties": {
    "foo": {
      "type": "string",
      "format": "string"
    }
  },
  "required": [
    "foo"
  ]
}
```

Table 2 shows an example that describes an excerpt from a research project on the connection of machine tool data.

TABLE 2

```
{
  "$schema": "http://schema.katulu.io/_/draft-01",
  "$id": "https://schema.katulu.io/example/uniwear",
  "title": "Uniwear",
  "description": "A multi-material machine tool wear
```

TABLE 2-continued

```
  dataset    for prognostics and health monitoring.",
  "type": "object",
  "properties": {
    "timestamp": {
      "type": "string",
      "format": "date-time"
    },
    "vibration_x": {
      "type": "number",
      "format": "float64"
    },
    "vibration_y": {
      "type": "number",
      "format": "float64"
    },
    "vibration_z": {
      "type": "number",
      "format": "float64"
    },
    ...
    "tool_wear": {
      "description": "Wear measured in mm",
      "type": "number",
      "format": "float64",
      "unit": "mm"
    }
  },
  "required": [
    "timestamp"
    "vibration_x",
    "vibration_y",
    "vibration_z",
    ...
    "tool_wear"
  ]
}
```

Here, the keyword "$schema" references the meta-schema to be used which, for example, extends an existing JSON schema by the keyword "unit" in order to capture units.

The keywords "title" and "description" are used to capture metadata. The properties, referred to as "properties", are used to describe the properties of a date, i.e. a value, similar to columns in a table. The property "tool_wear" illustrates the definition of format, data type, unit and metadata.

As an example, the schemas are represented here by a subset of the open JSON schema standard. By using open schema standards, existing tools can be used and maximum compatibility with other systems can be guaranteed. Other schema standards may be used in the same way.

To extend the limited possibilities of data access to the input data records for federated computing, an efficient method is required to extract the data schemas and register them in the server.

So-called data connectors may be used to simplify the process of registering data of different types and from different sources in a similar way and making them jointly processable.

Connectors offer the possibility of automatically extracting schemas from the data provided and (at a later point in time) loading the data so that it can be used when generating the output data records from the input data records using the process pipeline.

Examples of such connectors are SQL connectors that are compatible with SQLite, MSSQL, PostgreSQL and other databases, industry standard connectors such as OPC UA and MQTT for manufacturing systems, connectors for reading image data from hard disks, test connectors for loading data from Parquet files or CSVs.

The data schemas are extracted both from the available data source type information, i.e. what type is the data source and the information on it, and from sample data from the input data records. The schemas may also be checked for correctness using type definitions such as different number types, date formats, UUIDs, etc.

The extracted input data schemas are transferred from the client 110 to the server 120 in step 220. In order to increase security during transfer via an insecure channel, such as the Internet, the schemes to be transferred may be protected using conventional encryption techniques. Signing or both together is also possible.

On the server side, in step 310, the server 120 receives the input data schemas sent in by the clients 110. In step 320, the server 120 registers the received input data schemas. This may be done in a database, a text file, or in any other suitable form. By registering, an assignment of the input data schemas and the clients 110 on which the corresponding input data records are stored is created in the server 120.

The fact that the input data schemas of the input data records are registered in the server 120 makes it possible in particular to use the existing input data records several times, for example also for applications of different types, without having to carry out pre-processing again. For example, the same input data record in a vehicle may first be used to train a model for recognizing traffic signs and then to perform an analysis of the recorded traffic. This saves energy, among other things, as multiple transfer of information regarding the available input data records can be avoided. This also saves storage space, as this information is also stored on data carriers. Both the energy savings and the reduction in storage space required also reduce CO2 emissions when all devices are taken together.

In an optional step 321, a user 130 may make a request from the server 120, in response to which the server 120 outputs the registered input data schemas in step 322. This may be a complete list of the registered input data schemas or, if the request includes corresponding criteria, only contain the registered input data schemas that match the criteria.

The user 130 may, either after receiving the list of registered input data schemas in step 322 or even without having performed the request, send a process pipeline to the server 120 or enter it directly at the server. In step 330, the process pipeline is received by the server 120.

The process pipeline is based on a process data schema that meets the requirements of the user 130 for the intended task of federated computing. Here, the process data schema may be configured based on the registered input data schemas received in step 322.

A process pipeline defines the calculation rules that are to be executed on the input data. All the processes defined in it, also known as operations, are provided with type information so that the compatibility between the processes and with the process data schema on which the process pipeline is based may be checked. This may be done during compilation, as part of other processing steps or separately. The type system of the type information enables a structural comparison between individual types that are defined in the input data schemas for the input data records.

An input data record may, for example, consist of a series of measured length values and associated time data. The type could then be defined as: {length, time}. The input data record then includes data of length type and data of time type.

An operation to select a specific property, i.e. feature, requires that the property is present, which is described as an input type, i.e. type of input data. The output type, i.e. the type of output data, of the operation is then the result of applying the operation to the input type. In the case of loop-type operations, the resulting output type, i.e. the output data resulting from the operation, may in turn be used as input for the next loop of operations.

This allows feature extraction to be used in federated computing via the process pipeline, since the process pipeline may be used to ensure that the input data schemas match the process data schema even before the process pipeline is transmitted from the server 120 to the clients 110. This is the only way to ensure that feature extraction is also transmitted as one or more operations as part of the process pipeline. This also makes it possible to easily reuse the input data records, as the feature extraction is not stored in the input data records specifically prepared for each application via pre-processing, as was previously the case. This also makes it clear that it is not necessary to save different versions of the available input data records, each prepared separately for one application, but that it is sufficient to extract the data schema of each input data record only once.

The following excerpts in table 3 show simple variants of a model and a process pipeline for predicting tool wear based on force and vibration.

TABLE 3

Querying the input scheme of the server 120 by a user 130 in step 321:
    with connect(SERVER_URL) as session:
        dataset = session.find_dataset(name="uniwear")
        source = Source(dataset)
Definition of operations for prcessing input data and extracting features as part of the process pipline:
    inputs = source | Zip(Select("timestamp", "vibration_x",
      "vibration_y", ...), Select("vibration_x",
      "vibration_y", ...) | Skew( ),
    Select("vibration_x",    "vibration_y", ...) | SNR( ) ) |
    Cast(to=Float32) |    Normalize( )
    targets =    source | Select("tool_wear") |
Definition of the model using the PyTorch framework. The function "shape(inputs)" references the output of the last step in the processing (e.g. also feature extraction) of the input data:
    model =     torch.nn.Sequential(
        torch.nn.Linear(shape(inputs), 10),
        torch.nn.Sigmoid( ),
        torch.nn.Linear(10, 14),
        torch.nn.Sigmoid( ),
        torch.nn.Linear(14, 1),
    )
This definition may also be included in the process pipline.

TABLE 3-continued

Configuration of parameters for machine learning and definition of the complete process pipline (also known as workload):

```
BATCH_SIZE = 30
NUM_ROUNDS = 12
LEARNING_RATE = 1e-3
workload = build_workload(
    name="uniwear",
    inputs=inputs,
    targets=targets,
    model=model_from_torch(model, torch.randn(BATCH_SIZE,
INPUT_SHAPE)),
    config=WorkloadConfig(
        num_rounds=NUM_ROUNDS,
        batch_size=BATCH_SIZE,
        optimizer=Adam(learning_rate=LEARNING_RATE),
        loss_function="mse",
        metrics=["mse"],
    ),
)
```

In the following code, the process pipline (i.e. workload) is transferred in the first line in a sesson on the server (corresponds to step 330), transferred to the clients 110 (corresponds to steps 230 and 340) and, after receiving the output data, the aggregated output data (step 370) are provided in the second line:

```
results = session.run(workload)
print(results)
```

In addition to the output data metrics for evaluating the output data may also be included.

Table 4 shows an example of simple variants of a model and a process pipeline for classifying network traffic.

TABLE 4

```
with connect(SERVER_URL) as session:
    dataset = session.find_sources(name="iot_netflow")
    source = Source(dataset)
    inputs = source | Select(
        "id.orig_h",
        "id.orig_p",
        "id.resp_h",
        "id.resp_p",
        "duration",
        "orig_bytes",
        "resp_bytes",
        "missed_bytes",
        "orig_pkts",
        "orig_ip_bytes",
        "resp_pkts",
        "resp_ip_bytes",
    ) | Cast(to=Float32) | Normalize( )
    targets = source | Select("label") |
EncodeLabels(labels=["Benign", "Malicious"], values= [0, 1])
    model = torch.nn.Sequential(
        torch.nn.Linear(shape(inputs), 40),
        torch.nn.ReLU( ),
        torch.nn.Linear(40, 38),
        torch.nn.ReLU( ),
        torch.nn.Linear(38, 1),
    )
    BATCH_SIZE = 512
    workload = build_workload(
        name="iot_netflow",
        inputs=inputs,
        targets=targets,
        model=model_from_torch(model, torch.randn(BATCH SIZE,
            INPUT_SHAPE)),
        config=WorkloadConfig(
            num_rounds=5,
            batch_size=BATCH_SIZE,
            optimizer=Adam(learning_rate=1e-3),
            loss_function="binary_crossentropy",
            metrics=["accuracy"],
        ),
    )
    results = session.run(workload)
    print(results)
```

The following considerations may also be taken into account:

A system for federated computing, where the server 120 does not have access to direct pipeline results (including error reports), is a prerequisite for various applications such as privacy-compliant federated computing, such as bandwidth-friendly machine learning.

Ideally, the pipeline only supports a limited number of known operations. This makes it more difficult to execute arbitrary code with potentially high security and data protection risks. Alternatively, the operations may be restricted (e.g. by sandboxing). However, this makes static validation and error handling unnecessarily difficult.

The pipeline may be created and statically checked against the input data schema to ensure that data and data operations are compatible. This ensures that the processing of the pipeline does not fail as long as all transferred input data matches the process data schema of the pipeline.

Each operation used in the process pipeline must be deterministic in order to enable an evaluation of the resulting output data records and multiple execution. For example, random numbers (so-called seeds) may be defined when creating the pipeline.

The client 110, or the computing unit 112, may check the data against the input data schema and then pass over only matching data, i.e. input data records whose schema matches the process data schema, to the process pipeline.

In step 331, the process pipeline may optionally be checked against available data schema, i.e. whether the pipeline is executable on the associated data records. For example, an executability check may be performed against all registered input data schemas, against some of the registered input data schemas that meet certain criteria, for example, or against a separately provided data schema, such as the process data schema. When the process pipeline is based on a process data schema, it is possible to verify that all operations of the pipeline are applicable to the particular data source that has a corresponding schema, and to ensure that the input data are compatible with the pipeline by validating the current input data records against the process data schema during processing of the process pipeline.

In step 332, which is also optional and may also be performed before step 331, the process pipeline is packaged into a format. The pipeline may also be received by the user 130 already packaged in this format. For example, the format may be a binary format that describes the process pipeline in a directed, acyclic graph. Alternatively, the format may be a byte code that is suited for execution in a virtual machine.

Further details or alternatives are so-called Docker containers, which has the advantage that the user can use 130 existing tools for feature extraction. WebAssembly, WASM, may also be used for packaging, which enables secure execution (sandboxing), and the resulting binary files are normally smaller. The Python Pickle module could also be used, although further steps may need to be taken to ensure secure execution.

For example, the binary format may also be based on the ONNX standard (Open Neural Network Exchange standard), which uses protocol buffers to serialize structured data. By using a binary format which has also been optimized for the transfer of learning models, the runtime complexity can be reduced as some of the operations can be used for both the models and data preparation.

It should also be mentioned that the process pipeline may be limited to a predefined list of operations. This means that only the operations from this list are supported by the clients 110. With such a limited number of supported operations, the execution of unwanted or malicious code is made more difficult.

Finally, in step 335, the pipeline may encrypt the process pipeline using known encryption techniques to better protect it for subsequent transfer. Alternatively, encryption and signing may be carried out instead of pure encryption, so that in addition to the invariability of the process pipeline, proof of origin is also possible. Signing alone is also possible in step 335.

The process pipeline may also be received from server 120 already encrypted and/or signed. The encryption and/or signature may then be applied by the user or an upstream computer. In this sense, end-to-end encryption may be implemented from the user 130 to the clients 110 to further increase data security.

In the following step 340, the process pipeline is transferred to one or more of the clients 110. Here, bandwidth may be saved if the process pipeline is only transmitted to the clients 110 for which input data schemas are registered in the server 120 that match the process data schema on which the process pipeline is based. The necessary match does not have to be complete, but may be set with a parameter so that a certain similarity, depending on the parameter, is sufficient to add a client 110 to the group of clients 110 that receive the process pipeline.

In the clients 110 that receive the process pipeline, this is received in step 230. As described above, the transfer may take place via data communication, which is wired or wireless, via the Internet or via a storage medium.

If the process pipeline has been encrypted before transfer, a client 110 that has received the process pipeline may decrypt it again in the optional step 235. If the process pipeline has been signed, the client 110 may check the origin.

In step 240, each of the clients 110 that has received the process pipeline generates an output data record from one of the input data records whose input data schema matches the process data schema. The match does not have to be complete, as described above.

Step 240 therefore represents the actual calculation in federated calculation. The calculation in step 240, i.e. the generation of the output data records, may represent machine learning depending on the existing input data records and process pipeline. The input data records are used as training data, wherein the process pipeline describes both the processing of the data and the learning process. The output data records then represent a trained model. The process pipeline may also include a model architecture so that the trained model corresponds to a predetermined architecture. Architectures may, for example, comprise the layer model of a neural network. Each output data record of a client 110 may also represent only a portion of a trained model, which the client 110 combines into a single trained model before transferring it to the server.

Depending on whether the client 110 has already stored the input data, for example by the optional step 201 as explained above, the client 110, or the computing unit 112 of the client 110, may also request corresponding input data records only at this later time in step 236. The request may be directed to storage units 111 or also to users or other computers. In the following step 237, the requested input data records are provided to the client 110 or the computing unit 111.

The result of the request may be a complete list of the available input data records or, if the request comprises corresponding criteria, it may only contain the available input data records that meet the criteria. Such criteria may be taken from the process pipeline, for example, and enable a compliance check of the input data schemas of the input data records with the process data schema.

A factory with several milling machines may be used as an example. Each of the machines may include its own historical history and measurement data and the process pipeline is used by the client 110 to train a sub-model for each of the machines, for example to optimize travel routes or reduce material waste. The subnetworks generated in this way may be combined by the client 110 and transferred to the server 120.

Another example is a material analysis in which various facilities have stored measured values for materials and the process pipeline describes a corresponding analysis procedure. The clients 110 analyze the locally available data records and return the results as output data records.

In step 250, the output data records generated by the clients 110 are then transferred to the server 120. On the server side, the server 120 receives the output data records from one or more clients 110 in step 350.

In a step not shown in the figures, the output data records from the clients 110 may also be encrypted and alternatively or additionally signed, analogous to the encryption of the input data schemas and the process pipeline already described. The server 120 may then decrypt the received output data records and check their origin. The aggregated output data records may also be encrypted and/or signed in this way so that, for example, only authorized persons can access the content of the federated computing system, which also increases data security.

In the following step 360, the server 120 aggregates the output data records received for a process pipeline into an overall result and provides this, i.e. the aggregated output data records, to the user 130 in step 370.

In the example described above, the server would receive such results from several companies and aggregate them into an entire trained network, which significantly increases the quality, as many times more training cycles have been executed. The same may be done for the analysis results of several clients 110.

A system 100 comprises a server 120 and one or more clients 110, wherein the clients 110 and the Server 120 may correspond to any of the previously described embodiments.

In some embodiments, federated computing is realized by a common method comprising both the steps of the server 120 and the client 110.

A further embodiment is a computer program product comprising instructions which, when the program is executed by a computer, cause the computer to perform one of the methods described above.

A further embodiment is a computer-readable medium on which the computer program product is stored.

The exemplary embodiments show possible embodiment variants, wherein it should be noted at this point that the invention is not limited to the specifically illustrated embodiment variants thereof, but rather various combinations of the individual embodiment variants with one another are also possible.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A device as a server for a federated computing system, which is configured to:
   receive input data schemas from one or more clients;
   register the received input data schemas;
   transfer a process pipeline to one or more of the clients whose registered input data schemas match a process data schema of the process pipeline, wherein the process pipeline is based on the process data schema;
   receive output data records from one or more clients;
   aggregate the output data records received; and
   provide the aggregated output data records to a user.

2. The device according to claim 1, further configured to output the registered input data schemas as process data schemas in response to a request from the user.

3. The device according to claim 1, further configured to check the executability of the process pipeline for the registered input data schemas.

4. The device according to claim 1, wherein the process pipeline is configured such that by generating an output data record from an input data record:
   machine learning is performed in such a way that the input data record is used as training data and the output data record represents a trained model or part thereof, or
   an analysis is performed in such a way that the input data record is analyzed and the output data record represents analysis results or a part thereof.

5. The device according to claim 1, wherein the process pipeline is packaged in a format wherein:
   the format is a binary format that describes the process pipeline in a directed, acyclic graph, or
   the format is a byte code that is suited for execution in a virtual machine.

6. The device according to claim 1, wherein the input data schemas, the process pipeline and/or at least one of the output data records is encrypted, or encrypted and signed, and is decryptable, or decryptable and verifiable, by the clients or the server.

7. The device according to claim 1, further configured to receive the process pipeline from the user.

8. A system for federated computing comprising:
   one or more clients, and
   a server which is configured to:
      receive input data schemas from the clients;
      register the received input data schemas;
      transfer a process pipeline to one or more of the clients whose registered input data schemas match a process data schema of the process pipeline, wherein the process pipeline is based on the process data schema;
      receive output data records from one or more of the clients;
      aggregate the output data records received; and
      provide the aggregated output data records to a user, and
   wherein each of the one or more clients is configured to:
      save one or more input data records;
      extract an input data schema from each input data record;
      transfer the extracted input data schemas to a server;
      receive the process pipeline from the server;
      generate an output data record from one or more of the input data records using the process pipeline; and
      transfer the generated output data records to the server.

9. The system according to claim 8, wherein the server is further configured to receive the process pipeline from the user.

10. A computer-implemented server method for federated computing for a server, the method comprising:
    receiving input data schemas from one or more clients;
    registering the received input data schemas;
    obtaining a process pipeline based on a process data schema;
    transferring the process pipeline to one or more clients whose registered input data schemas match the process data schema;
    receiving output data records from one or more clients;
    aggregating the received output data records; and
    providing the aggregated output records to a user.

11. The method according to claim 10, wherein the method further comprises, prior to obtaining the process pipeline, obtaining a request from the user and, in response thereto, outputting the input data schemas registered in the server as process data schemas.

12. The method according to claim 10, further comprising checking the executability of the process pipeline for the registered input data schemas.

13. The method according to claim 10, further comprising packaging, prior to transferring, the process pipeline into a format, wherein
    the format is a binary format that describes the process pipeline in a directed, acyclic graph, or
    the format is a byte code that is suited for execution in a virtual machine.

14. The method according to claim 10, further comprising decrypting the input data schemas and/or encrypting, or encrypting and signing, the process pipeline and/or at least one of the output data records.

15. The method according to claim 10, wherein the step of obtaining the process pipeline includes obtaining the process pipeline from the user, and wherein the process data schema is defined by the user.

16. A computer-implemented method for federated computing comprising the steps of server method for a server, the server method comprising:
 receiving input data schemas from one or more clients;
 registering the received input data schemas;
 transferring a process pipeline to one or more clients whose registered input data schemas match a process data schema of the process pipeline, wherein the process pipeline is based on the process data schema;
 receiving output data records from one or more clients;
 aggregating the received output data records; and
 providing the aggregated output records to a user; and
a client method for a client having one or more input data records, the client method comprising:
 extracting an input data schema from each input data record;
 transferring the extracted input data schemas to the server;
 receiving the process pipeline from the server;
 generating a corresponding output data record from one or more of the input data records using the process pipeline; and
 transferring the generated output data records to the server.

17. A computer program product having a program for a data processing system, the computer program product comprising software code portions for performing the following steps when the program is executed on the data processing system:
 extracting an input data schema from each input data record;
 transferring the extracted input data schemas to a server;
 receiving from the server a process pipeline based on a process data schema;
 using the process pipeline, generating a corresponding output data record from one or more of the input data records whose input data schema matches the process data schema; and
 transferring the generated output data records to the server.

18. The computer program product according to claim 17, wherein the computer program product comprises a computer-readable medium on which the software code portions are stored, wherein the program is directly loadable into an internal memory of the data processing system.

* * * * *